(12) United States Patent
Huntley

(10) Patent No.: US 7,045,191 B2
(45) Date of Patent: May 16, 2006

(54) STUFFED TEXTILE ARTICLE

(75) Inventor: Peter Huntley, Ann Arbor, MI (US)

(73) Assignee: American Quality Assurance Corporation, Plymouth, MI (US)

( * ) Notice: Subject to any disclaimer, the term of this patent is extended or adjusted under 35 U.S.C. 154(b) by 0 days.

(21) Appl. No.: 10/930,423

(22) Filed: Aug. 31, 2004

(65) Prior Publication Data
US 2006/0046024 A1    Mar. 2, 2006

(51) Int. Cl.
B32B 3/10    (2006.01)
B32B 3/12    (2006.01)

(52) U.S. Cl. ............. 428/137; 428/117; 428/131; 428/134; 428/136; 442/61; 442/85; 112/420; 112/421; 112/440; 112/475.04; 5/485; 5/502; 5/950; 5/952; 156/65; 156/70; 156/290; 156/292

(58) Field of Classification Search ............... 428/117, 428/131, 134, 136, 137, 156; 442/61, 85; 112/420, 421, 440, 475.04, 475.08; 5/485, 5/502, 950, 952; 156/65, 70, 93, 290, 292
See application file for complete search history.

(56) References Cited

U.S. PATENT DOCUMENTS 1,893,548 A    1/1933    Hardy
2,818,089 A    12/1957    Mayhill
4,017,002 A *  4/1977    Doyle et al. ............... 221/63
4,426,945 A    1/1984    A-Yan
5,987,669 A    11/1999   Leggett et al.

* cited by examiner

Primary Examiner—Terrel Morris
Assistant Examiner—Andrew Piziali
(74) Attorney, Agent, or Firm—Reising, Ethington, Barnes, Kisselle, P.C.

(57) ABSTRACT

A stuffed textile article and method of manufacturing the same has at least one compartment having a baffle gate which receives a tube-like stuffing tool through which loose stuffing is blown into the compartment. Upon removal of the tool, the surrounding layers and panels which define the compartment are placed under tension by the stuffing causing the baffle gates to automatically close upon removal of the tool permanently preventing migration of the stuffing out of the compartment. The gate has a primary panel secured to the top and bottom layers of the article and an adjacent secondary panel at least partially covering the primary panel. The primary panel has a slit and the secondary panel has a slot. Taken individually, the slit and slot are each preferably longer than the thickness of the stuffed textile article and longer than half the circumference of the stuffing tool. This enables use of the stuffing tool on stuffed textile articles having a thickness which is generally less than half the circumference of the tool. The slit and slot cross one-another preferably at about their mid-points. For easy insertion, the tool is chamfered having a blunt extremity which makes first contact with the panels at about the cross-over point to minimize snagging of the tool.

21 Claims, 4 Drawing Sheets

STUFFED TEXTILE ARTICLE

TECHNICAL FIELD

The present invention relates generally to a stuffed textile article and more particularly to a stuffing compartment entry gate of the stuffed textile article.

BACKGROUND

Certain textile articles often required for warmth such as comforters and coats, typically contain a series of compartments separated from one-another by a fabric baffle or perforatable wall. Each compartment contains loose filling material such as feathers, vegetable fibers, or artificial fibers in loose, unmated, form. In all cases, a required quantity of filling material is blown into each of the compartments by means of one or more filling-tube tools. The filling-tube tool penetrates each compartment through an opening in the wall between compartments. Unfortunately, the opening used for filling remains open to some extent after the filling process has been completed. This partial opening permits filling material to migrate from one compartment to another and therefore the textile article does not maintain the required amount of filling material in each compartment over a period of time.

Typically, the fabric walls are elongated and extend longitudinally across the width of each compartment and extend laterally between opposite outer layers of the textile article. The lateral extension, or height, of the wall generally designates the thickness of the stuffed article. A known design for a gate comprises a slit in a single layered fabric wall which extends in the lateral direction. To accept entry of the filling-tube tool, the slit has a length which is slightly greater than half the circumference of the filling-tube tool. Unfortunately, the known laterally extending slits have a maximum length generally limited to the thickness of the stuffed article. Because the filling-tube tool has a minimum diameter in which filling material can flow during the blowing-in process, the corresponding length of the slit in the known design limits the minimum thickness of the stuffed article.

SUMMARY

A stuffed textile article of the present invention has at least one compartment having a baffle gate which receives a tube-like stuffing tool through which loose stuffing or filling material is blown into the compartment. Upon removal of the tool, panels of the baffle gate and the surrounding exterior layers which define the compartment are placed under tension by the stuffing causing the baffle gate to automatically close upon removal of the tool, thus permanently preventing migration of the stuffing out of the compartment. The baffle gate has a primary panel secured to the top and bottom layers of the article and an adjacent secondary panel layered against the primary panel. The primary panel has a slit and the secondary panel has a slot which are each preferably slightly longer than half the diameter of the filling tool. The slit and slot cross one-another preferably at about their mid-points. For easy insertion, the tool is chamfered having a blunt extremity which makes first contact with the panels at the baffle gate near the slot.

Preferably, the present invention includes a method of manufacturing the baffle gates which are preformed as baffle ribbons cut from a primary sheet preferably stitched to a secondary sheet. Each sheet has a respective matrix of slots and slits aligned to form a plurality of baffle gates of the ribbon which is then engaged laterally between the exterior layers.

Objects, features and advantages of this invention includes the prevention of stuffing migration from one compartment to the adjacent compartment in a stuffed textile article. Other advantages include sustained warmth for the user, a prolonged pleasing appearance, and ease of utilization of conventional tube-like stuffing tools during manufacturing which are less likely to snag. Yet further, the article is inexpensive to manufacture, of a relatively simple design, is rugged and durable, and has a long and useful life.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENTS

Figure 1:
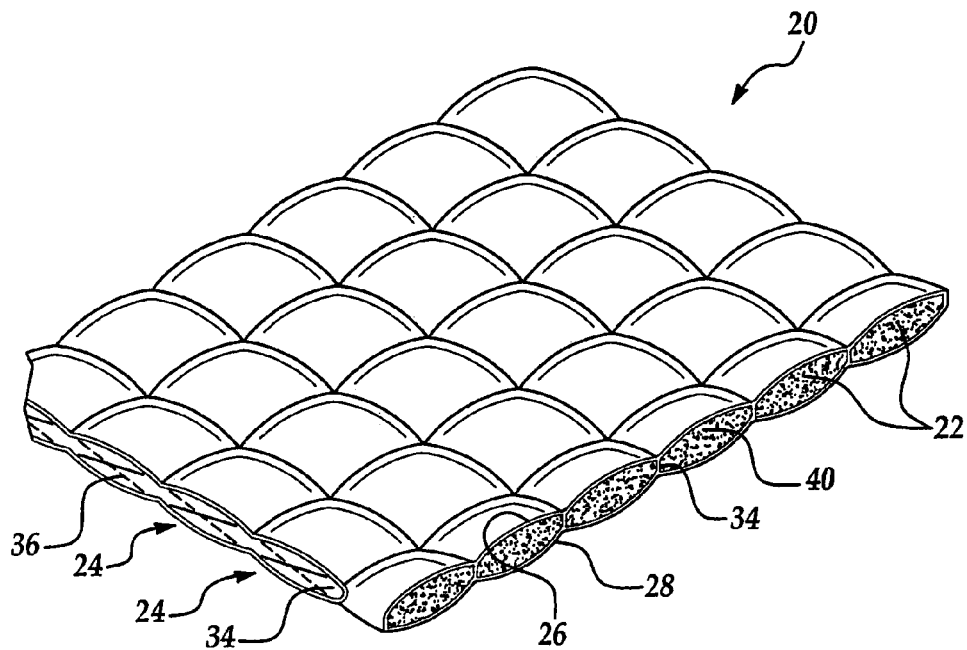
FIG. 1 is a partial cross sectioned perspective view of a stuffed textile article of the present invention.
Figure 2:
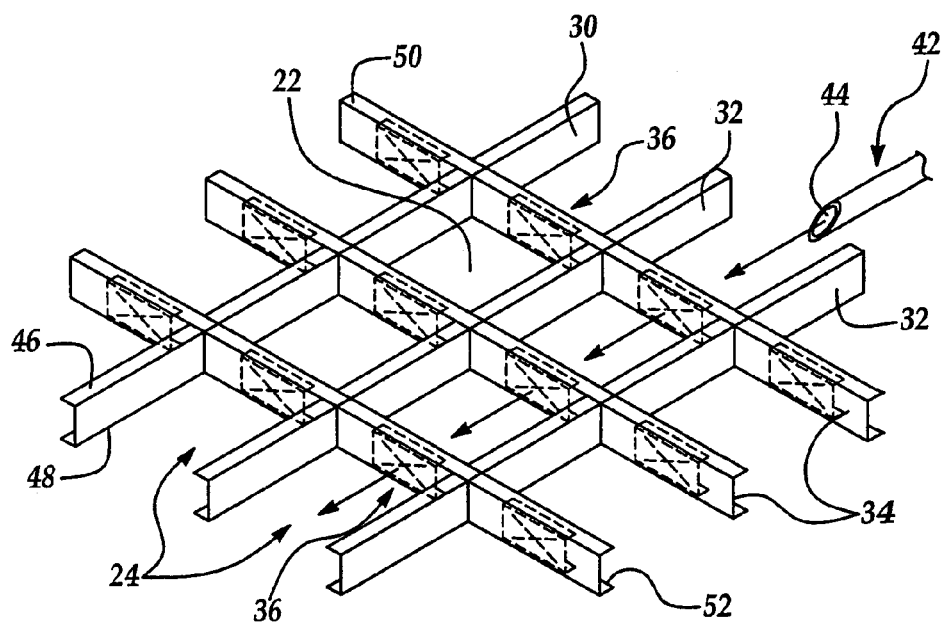
FIG. 2 is a perspective view of internal ribbons and baffle gates of the stuffed textile article.
Figure 3:
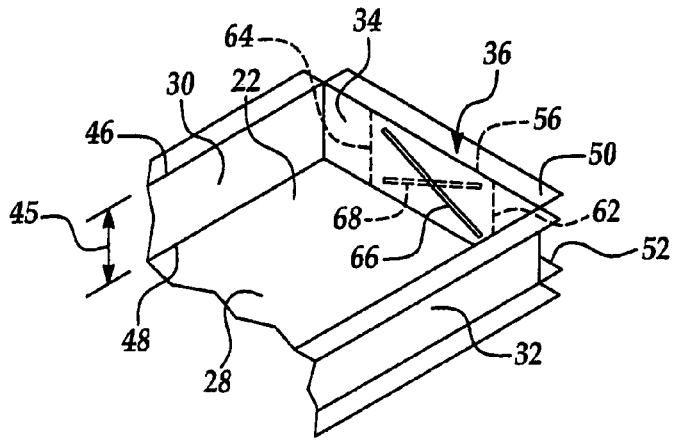
FIG. 3 is a perspective view of a stuffing compartment of the stuffed textile article with a top layer removed to show detail below.

As best illustrated in FIGS. 1 and 2, a stuffed textile article 20 has a plurality of stuffing compartments or pockets 22 arranged in a series of rows 24 aligned side-by-side. The article 20 as illustrated is a blanket or comforter, but may also be any variety of other textile articles such as a coat, jacket or a stuffed toy animal. Each compartment 22 is preferably defined between a common upper or first layer 26 and a lower or second layer 28 spaced apart from one-another by a matrix of substantially parallel and alternating first and second divider ribbons 30, 32 which traverse the primary panels 34. The layers 26, 28 are preferably made of a fabric or flexible material which can be attached to the divider ribbons 30, 32 and primary panels 34, which are also of fabric or flexible material, via stitching, adhesion, heat bonding or the like. The primary panel 34 forms part of a baffle gate 36 which separates one compartment 22 from the next adjacent compartment, with a series of compartments, so aligned, forming the row 24. The alternating first and second divider ribbons 30, 32 define each row 24 width-wise and separate one row from the next adjacent row.

During manufacturing, each compartment 22 is individually filled with a loose filling material or stuffing 40 composed of down feathers, vegetable fibers, artificial fibers, synthetic material, or the like, and which is in loose un-matted form and preferably promotes warmth and creates an outer quilted appearance of the textile article 20. During the filling procedure, an elongated tube-like tool or nozzle 42, preferably having a leading chamfered end or oblong port 44, is shoved longitudinally down each row 24 and through successive baffle gates 36 located between each compartment 22 of the row 24. The gates 36 open against the strain of the tool permitting access of the tool 42 into the compartment 22. As the tool 42 is being withdrawn, the stuffing 40 is blown into each successive compartment 22. After each successive compartment 22 is completely filled with the desired quantity of stuffing 40, the tool is withdrawn from the individual compartment 22 and the respective baffle gate 36 automatically closes because the surrounding fabric (i.e. layers, dividing ribbons and panels) defining the compartment are pulled taught by the trapped stuffing. With the baffle gate 36 closed, migration of stuffing 40 from one compartment 22 to the next is prevented.

Referring to FIGS. 2–5, the alternating first and second dividing ribbons 30, 32 span laterally between and engage to the top and bottom layers 26, 28, and thus generally define the stuffing depth 45 of the textile article 20. Similarly, the elongated primary panels 34 span laterally between and engage to the top and bottom layers 26, 28 at a distance generally equal to the stuffing depth 45. The elongated primary panels 34 extend longitudinally between, and engage to, the first and second ribbons 30, 32. Each compartment 22 is defined generally in-part by opposing primary panels 34.

Preferably, each of the first and second dividing ribbons 30, 32 have longitudinally extending top and bottom edges or flaps 46, 48, and the primary panels 34 have longitudinally extending top and bottom lips 50, 52, all engaged or stitched to the respective top and bottom layers 26, 28. In-other-words, the panels 34 of the baffle gates 36 generally have the same lateral height or depth 45 as the dividing ribbons 30, 32 and are engaged to the top and bottom layers 26, 28 in like manner. Engagement to the layers 26, 28 is preferably performed with stitches 54, but depending upon the material and the desired appearance of the article 20, engagement can be achieved via any variety of methods including adhesion or hot pressing which can activate a glue or generally melt synthetic materials together.

The baffle gate 36 has a secondary panel 56 which covers a portion of the primary panel 34 and laterally spans between the top and bottom layers 26, 28. Top and bottom flaps 58, 60 of the secondary panel 56 are stitched to the respective top and bottom layers 26, 28 during the same stitching operation that attaches the primary panels 34 to the layers. In view of flaps 58, 60, opposing left and right edges or ends 62, 64 of the secondary panel 56 which are disposed generally against the primary panel 34, need not be stitched or secured directly to the primary panel 34. Alternatively, the top and bottom flaps 58, 60 can be eliminated and the secondary panel 56 can be attached to the primary panel 34 by adding stitches 59, 61 or adhesion along or generally near the opposite edges 62, 64 of the secondary panel 56.

Figure 4:
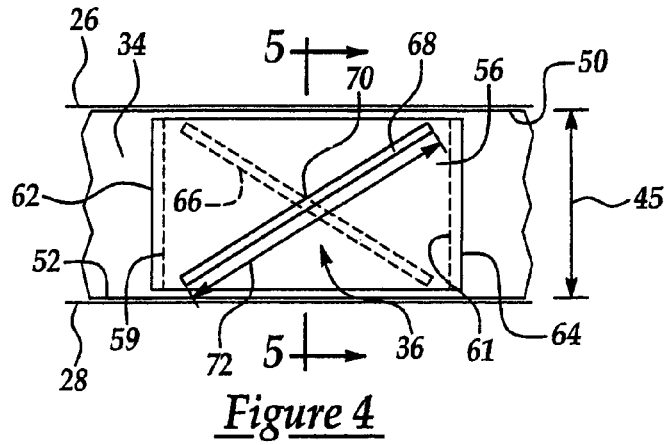
FIG. 4 is a frontal view of the baffle gate.
Figure 5:
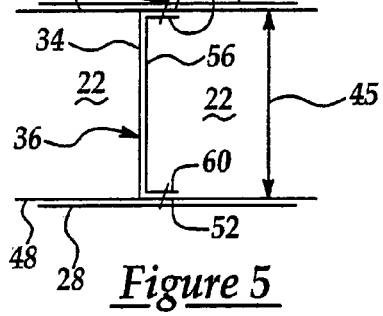
FIG. 5 is a cross section of the gate taken along line 5—5 of FIG. 4.

A slit 66 located through the primary panel 34 crosses over a slot 68 located through the secondary panel 56 at a mutual mid-point or cross-over point 70. Referring to FIG. 4, the slit 66 and slot 68 are substantially linear and each have a length 72 which is slightly greater than half the outer diameter of the stuffing tool 42 used to fill the compartments 22 as previously described. In applications where the stuffing depth 45 of the textile article 20 is generally less than half the minimum required circumference of the stuffing tool 42, the slit 66 and slot 68 are arranged at an angle to achieve the necessary lengths 72 for receiving the chamfered tool 42.

Figure 6:
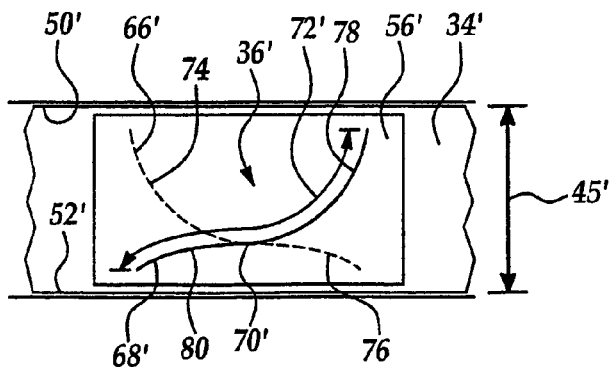
FIG. 6 is a frontal view of a second aspect of a baffle gate.

Referring to FIG. 6, another aspect of the present invention is illustrated wherein a slit 66' and slot 68' of a gate 36' are non-linear and preferably curved into a wave-form, providing an even greater length 72' for tool access. The slit 66' has a concave portion 74 open substantially upward and a concave portion 76 opened substantially downward. Similarly, the slot 68' has a concave portion 78 opened substantially upward and toward the portion 74, and a concave portion 80 opened substantially downward and toward the portion 76. All four portions 74, 76, 78, 80 meet at the cross-over point 70'. To eliminate snags and for easier insertion of the tool 42, the cross-over point 70' is not necessarily aligned toward the center of the panels 34', 56', and instead is aligned to meet the leading chamfered end or projecting point or blunt extremity 44 of the tool 42. Although slightly more involved to manufacture than the previously described slit 66 and slot 68, in certain applications, such as where the panel material is more rigid or less giving, the curved slits 66' and slots 68' can further reduce snags and decrease resistance when inserting the tool 42. In aspects of the invention where the ribbons 30', 32' are spaced far apart relative to the size of the gate 36', the gates are preferably located adjacent to either ribbon 30' or ribbon 32', so during the stuffing operation, the adjacent ribbon acts as a guide for the tool 42 and facilitates engagement of the tool's leading edge 44' with all the gate 36' in the same row 24'.

Figure 7:
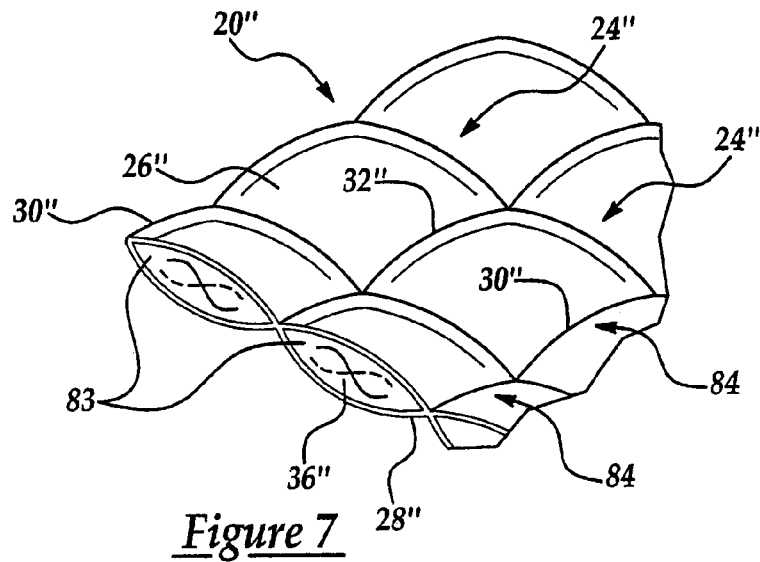
FIG. 7 is a partial cross section of a third aspect of a stuffed textile article in which internal dividing ribbons are eliminated.
Figure 10:
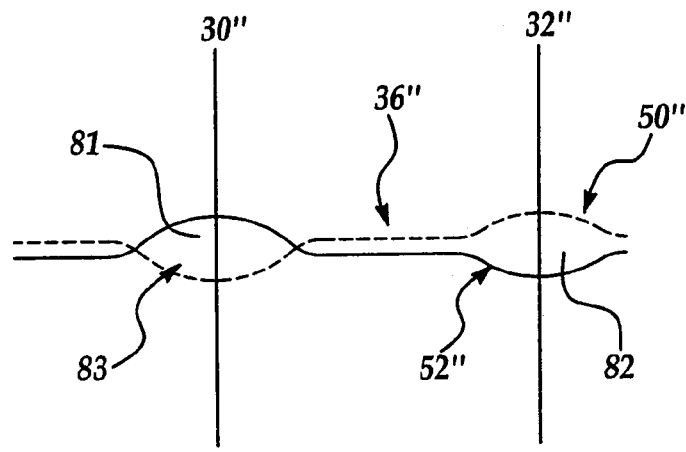
FIG. 10 is a partial plan view of the stuffed textile article of the third aspect a top layer removed to illustrate a counter rotation of the baffle gate ribbon between adjacent seams.

Referring to FIGS. 7 and 10, a third aspect of the present invention is illustrated wherein the dividing ribbons 30, 32 of the first aspect are replaced by stitched seams 30", 32" which attach the first layer 26" directly to the second layer 28". Preferably, when stitching to layers 26", 28", the primary panel 34" is twisted generally ninety degrees at seam 30" enabling the primary panel 34" to lie flat, and is counter twisted or rotated generally ninety degrees at seam 32", which also enables the primary panel 34" to lie flat at seam 32" while causing the actual baffle gate 36" to stand upright for receipt of the filling tool 42, as best shown in FIG. 10.

Figure 8:
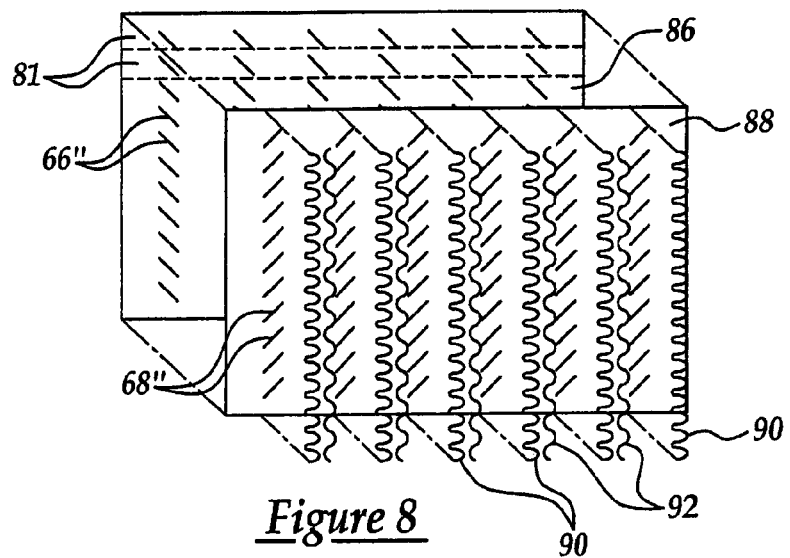
FIG. 8 is an exploded perspective of the third aspect illustrating primary and secondary baffle gate sheets.
Figure 9:
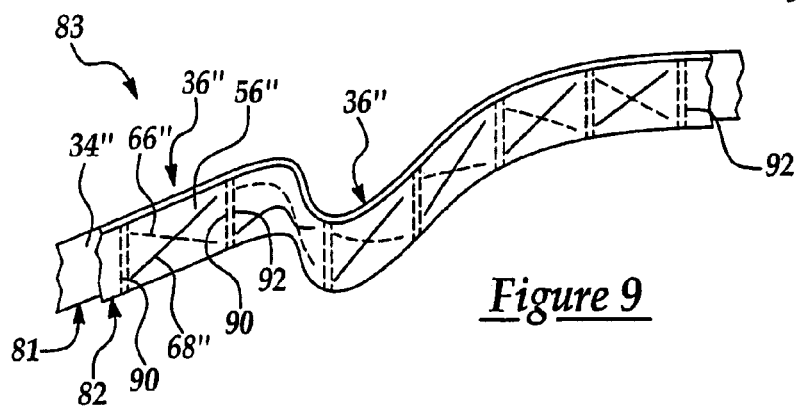
FIG. 9 is a perspective view of a baffle gate ribbon formed from the sheets of FIG. 8.

Referring to FIGS. 8 and 9, during manufacturing, the primary panels 34" of the baffle gates 36" are formed by one continuous, flexible, primary strip 81 and the secondary panels 56" are preferably formed by one continuous, flexible, secondary strip 82 which are pre-sewed together via stitches 90, 92 located between individual baffle gates 36". Together, the primary and secondary strips 81, 82 form a baffle gate ribbon 83 which traverses the rows 24" of compartments. A series of gate ribbons 83 spaced side-by-side define columns 84 of compartments traversed by the seams 30", 32". The secondary strip 82, or individual secondary panels 56", are sewn to the primary panels 34" of the primary strip 81, and then the gate ribbon 83 is sewn to the layers 26", 28".

The gate ribbons 83 forming the baffle gates 36" can be manufactured from a primary sheet 86 having a matrix of slits 66" and a secondary sheet 88 having a matrix of slots 68". Preferably, the sheets 86, 88 are first stitched together along seams 90, 92 which extend laterally with respect to the gate ribbons 83. Once stitched, the sheets 86, 88 are cut into the individual gate ribbons 83 which are then stitched between layers 26", 28" of the quilted article 20" along seams 30", 32".

Figure 11:
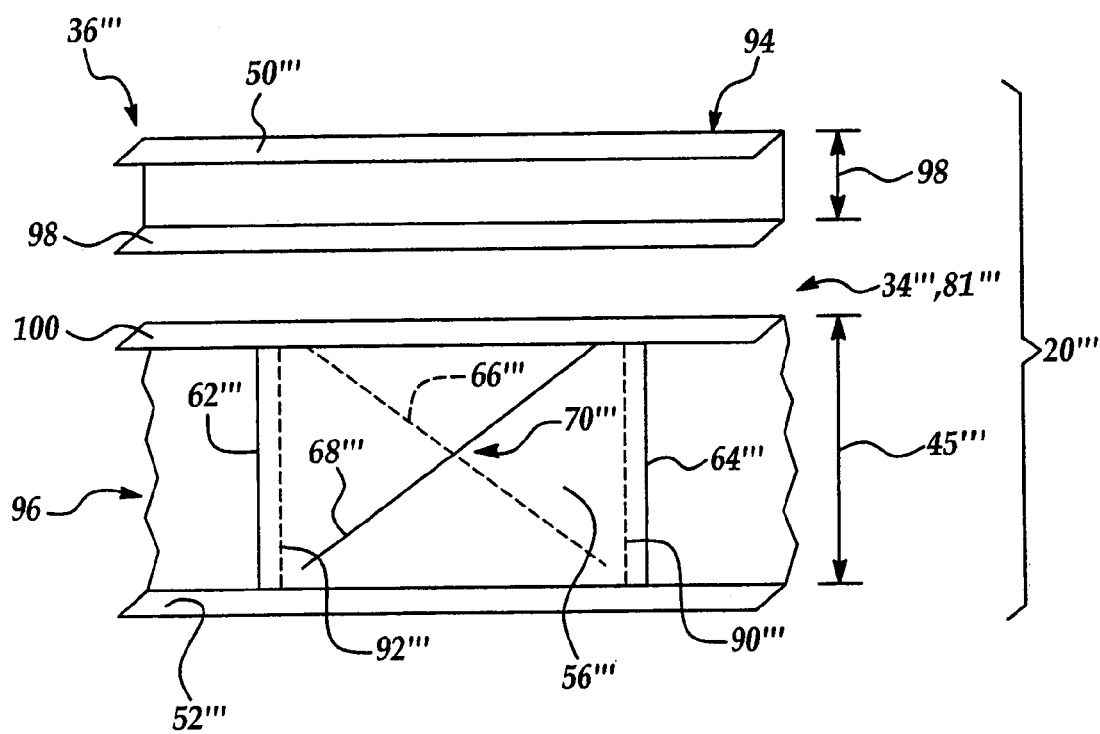
FIG. 11 is a frontal perspective and exploded view of a fourth aspect of a baffle gate similar in perspective to FIG. 4.

Referring to FIG. 11, a fourth aspect of a baffle gate 36''' of a stuffed textile article 20''' is illustrated. Baffle gate 36''' is similar to that illustrated in FIG. 4 except that the primary panel 34''' or primary strip 81''' is divided into an elongated first or upper portion 94 and an elongated second or lower portion 96. The elongated upper portion 94 has a height or depth indicated by arrow 98 which is preferably substantially less than the height or depth indicated by arrow 45''' of the lower portion 96 which generally carries the secondary panel 56''' or secondary strip 82'''. Similar to the aspect of FIG. 4, the upper portion 94 has a lip 50''' which secures to the top layer 26''' (not shown), and the lower portion 96 has a lip 52''' which secures to the bottom layer 28''' (not shown). The two portions 94, 96 co-extend and are secured or stitched to one-another along respective and longitudinally extending mid-lips 98, 100. Preferably, during manufacturing of the article 20''', the upper portion 94 and lower portion 96 are first secured to the respective top and bottom layers 26''', 28'''. Once secured, the two portions 94, 96 are then secured or stictched together along the respective mid-lips 98, 100.

While the forms of the invention herein disclosed constitute presently preferred aspects, many others are possible. For instance, the compartments need not be arranged in a uniform grid. The baffle gates 36 can be positioned between non-rectangular compartments which divide the stuffed article in an irregular pattern. It is not intended herein to mention all the possible equivalent forms or ramification of the invention. It is understood that terms used herein are merely descriptive, rather than limiting, and that various changes may be made without departing from the spirit or scope of the invention.

The invention claimed is:

1. A stuffed textile article comprising:
   a first layer;
   a second layer;
   a primary panel spanning between the first and second layers;
   a slit through the primary panel and located between the first and second layers;
   a filling compartment defined by the first layer, the second layer and the primary panel;
   a secondary panel generally covering the slit and layered adjacent to the primary panel; and
   a slot through the secondary panel and which crosses over the slit forming a baffle gate.

2. The stuffed textile article set forth in claim 1 wherein:
   the secondary panel comprises a first flap;
   the primary panel comprises a first lip attached directly between the first flap and the first layer;
   the secondary panel comprises a second flap; and
   the primary panel comprises a second lip attached directly between the second flap and the second layer.

3. The stuffed textile article set forth in claim 1 wherein the slit and slot are substantially linear and cross one-another at substantially mutual mid-points.

4. The stuffed textile article set forth in claim 3 comprising:
   a compartment depth measured between the first and second layers;
   the slot being longer than the compartment depth; and
   the slit being longer than the compartment depth.

5. The stuffed textile article set forth in claim 4 comprising:
   a first lip of the primary panel attached to the first layer;
   a second lip of the primary panel attached to the second layer; and
   wherein the slit and slot are generally angled with respect to the first and second lips.

6. The stuffed textile article set forth in claim 5 comprising:
   an elongated first portion of the primary panel having the first lip and an opposite longitudinally extending first mid-lip;
   an elongated second portion of the primary panel having the second lip and an opposite longitudinally extending second mid-lip; and
   wherein the first mid-lip is attached longitudinally to the second mid-lip.

7. The stuffed textile article set forth in claim 1 comprising:
   a plurality of compartments aligned in a row wherein the compartment is one of the plurality of compartments; and
   wherein each compartment of the plurality of compartments is at least partially defined by the first layer, the second layer, the primary panel of a respective compartment, and the secondary panel of an adjacent compartment of the plurality of compartments.

8. The stuffed textile article set forth in claim 7 comprising:
   a plurality of rows of compartments aligned side-by-side and wherein the row is one of the plurality of rows; and
   wherein the first and second layers define the plurality of compartments in each one of the plurality of rows.

9. The stuffed textile article set forth in claim 8 comprising a plurality of ribbons aligned side-by-side extending longitudinally with the plurality of rows and defining the plurality of compartments, wherein each one of the plurality of ribbons spans laterally between and engages to the first and second layers.

10. The stuffed textile article set forth in claim 8 wherein the first layer is engaged directly to the second layer between each row of the plurality of rows.

11. The stuffed textile article set forth in claim 10 comprising a stitched seam for engaging the first layer directly to the second layer between each row of the plurality of rows.

12. The stuffed textile article set forth in claim 1 being a comforter-type blanket.

13. The stuffed textile article set forth in claim 1 wherein the slit and slot are wave-form shaped.

14. The stuffed textile article set forth in claim 1 comprising:
   a first lip of the primary panel attached to the first layer:
   an opposite second lip of the primary panel attached to the second layer;
   a first edge of the secondary panel attached to the primary panel;
   an opposite second edge of the secondary panel attached to the primary panel; and
   wherein the slit and slot are orientated between the first and second edges.

15. A method of manufacturing the stuffed textile article set forth in claim 1 comprising the steps of:
   a. pushing a filler tool through a slot of a first panel at a cross-over point;
   b. pushing the filler tool at the cross-over point through a slit of a second panel covering the first panel;

c. positioning a port end of the filler tool into a first stuffing compartment defined in-part by the second panel;
d. flowing stuffing material through the filler tool and into the first compartment;
e. pulling the first and second panels taught by filling the first compartment;
f. withdrawing of the filler tool from the first compartment; and
g. closing of the slot and slit via tension placed upon the respective first and second panels by the stuffing material in the first compartment.

16. The method of manufacturing a stuffed textile article set forth in claim 15 comprising the further steps of:
   pushing the filler tool through a slot of a third panel immediately after step "c;"
   pushing the filler tool through a slit of a fourth panel at least partially covering the third panel;
   positioning the port end into a second stuffing compartment defined in-part by the fourth panel;
   flowing stuffing material through the filler tool and into the second compartment;
   pulling of the third and fourth panels taught by filling of the second compartment;
   withdrawing of the filler tool from the second compartment; and
   closing of the slot and slit via tension placed upon the respective third and fourth panels by the stuffing material in the second compartment.

17. The method of manufacturing the stuffed textile article set forth in claim 15 comprising the further steps of:
   stamping a plurality of slots into a first sheet forming a plurality of first panels;
   stamping a plurality of slits into a second sheet forming a plurality of second panels;
   aligning the first sheet directly over the second sheet so that each slot of the plurality of slots crosses over each respective slit of a plurality of slits at the cross-over points; and
   attaching the first sheet to the second sheet along a plurality of seams between adjacent crossing-slits-and-slots of the plurality of slits and slots.

18. The method of manufacturing the stuffed textile article set forth in claim 17 comprising the further step of cutting the first and second sheets into gate ribbons wherein the cut is perpendicular to the plurality of seams.

19. The method of manufacturing the stuffed textile article set forth in claim 15 comprising the further steps of:
   cutting the slit into a primary panel which is the second panel prior to step "a";
   cutting the slot into a secondary panel which is the first panel;
   at least partially covering the primary panel with the secondary panel; and
   attaching the secondary panel to the primary panel.

20. The method of manufacturing the stuffed textile article set forth in claim 19 further comprising the steps of:
   spanning the primary panel between first and second layers after attaching the secondary panel to the primary panel; and
   securing the primary panel to the first and second layers.

21. A stuffed textile article blow-filled with a loose stuffing by an elongated and substantial straight tubular filler tool, the stuffed textile article comprising:
   a first layer;
   a second layer; and
   a plurality of baffle gates separated from one-another by a respective compartment of a plurality of compartments, each one of the plurality of baffle gates spanning between the first and second layers having:
      a primary panel having a slit of sufficient length to accept the filler tool,
      a secondary panel layered adjacent to the primary panel having a slot of sufficient length to accept the tool, and
      a cross-over point where the slit crosses the slot and wherein the cross-over points of the plurality of baffle gates are located substantially along an imaginary straight linear line.

* * * * *